W. T. Vose,
Double-Acting Pump,
No. 1,146, Reissued Feb. 26, 1861.
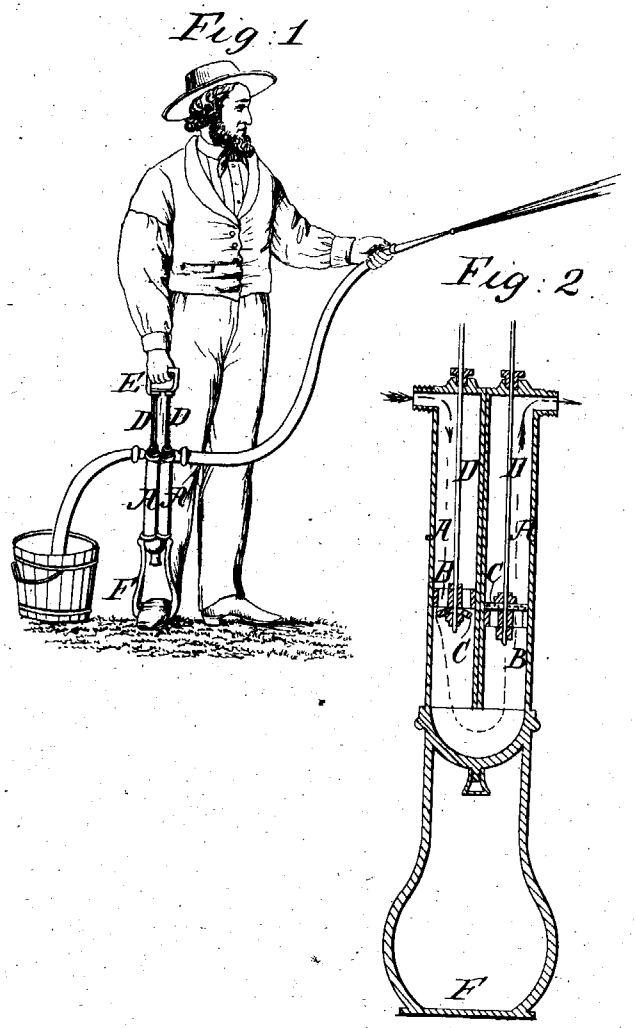

UNITED STATES PATENT OFFICE.

WILLIAM T. VOSE, OF NEWTONVILLE, MASSACHUSETTS.

IMPROVEMENT IN PORTABLE PUMPS.

Specification forming part of Letters Patent No. 26,135, dated November 15, 1859; Reissue No. 1,146, dated February 26, 1861.

*To all whom it may concern:*

Be it known that I, WILLIAM T. VOSE, of Newtonville, in the county of Middlesex and State of Massachusetts have invented a new and useful Improvement in Portable Forcing-Pumps; and I do hereby declare the same to be fully described in the following specification, and illustrated in the accompanying drawings, of which—

Figure 1 is a perspective view of a pump provided with my invention and exhibiting the manner in which it is held or supported by a person while in the act of putting such pump in operation. Fig. 2 is a sectional view of the pump barrel and its stand or foot-rest.

The pump shown in the drawings, and having my present invention or improvement combined with or applied to it, is that for which Letters Patent of the United States of America were granted to me on the 20th day of March, A. D. 1855.

The nature of my invention consists in the combination of a forcing-pump or the barrel thereof, with a stirrup or foot-stand by which the pump-barrel may be held in position by the foot of a person in order that such person by one of his hands may operate the piston and leave the other hand free to hold and direct the discharging-pipe of such pump.

In the drawings, A A denote a double-acting force-pump barrel, of which B B are the pistons, and C C their valves, the rods D D of such pistons being connected by a handle, E.

F is the foot piece, stirrup, or stand, it being, in this instance, a metallic bow flattened at its middle or lower part, and fastened at its two extremities to the pump-barrel.

A foot-rest may be combined with the barrel of a single-acting force-pump in such manner as to enable such pump to be held in position by a person's foot, while, with one hand, such person may have hold of the piston, his other hand having either hold of the piston or of a discharge-pipe.

Fig. 1 of the drawings exhibits the foot-rest or stand as not only resting on the ground, but as having the foot of the operator of the pump extended into the foot-rest, and so as to force or hold it downward in a manner to keep the pump steady while the piston is being worked or put in operation.

I claim—

The combination of a foot-stand, stirrup, or rest, as set forth, with a pump-barrel, in manner substantially as described.

WM. T. VOSE.

Witnesses:

R. H. EDDY,

F. P. HALE, Jr.